March 18, 1941.                T. H. SLOAN                    2,235,047
                        ADJUSTABLE GENEVA MECHANISM
                    Original Filed Sept. 30, 1938      2 Sheets-Sheet 1
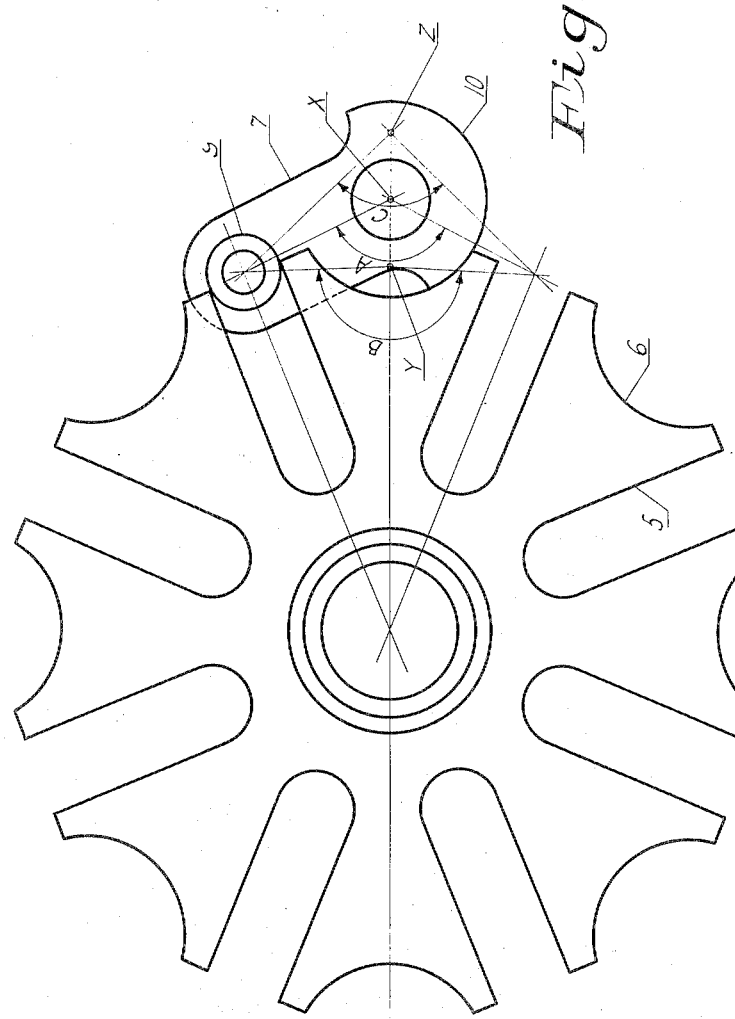
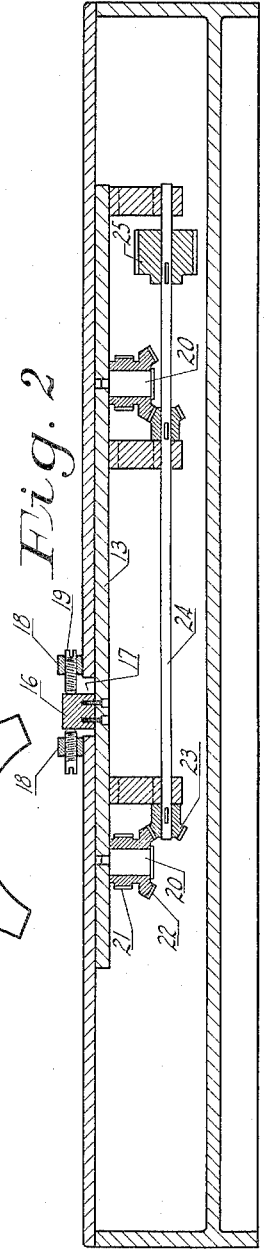
INVENTOR.
Theodore H Sloan
BY William B. Jaspert
ATTORNEY.

March 18, 1941. T. H. SLOAN 2,235,047
ADJUSTABLE GENEVA MECHANISM
Original Filed Sept. 30, 1938 2 Sheets-Sheet 2
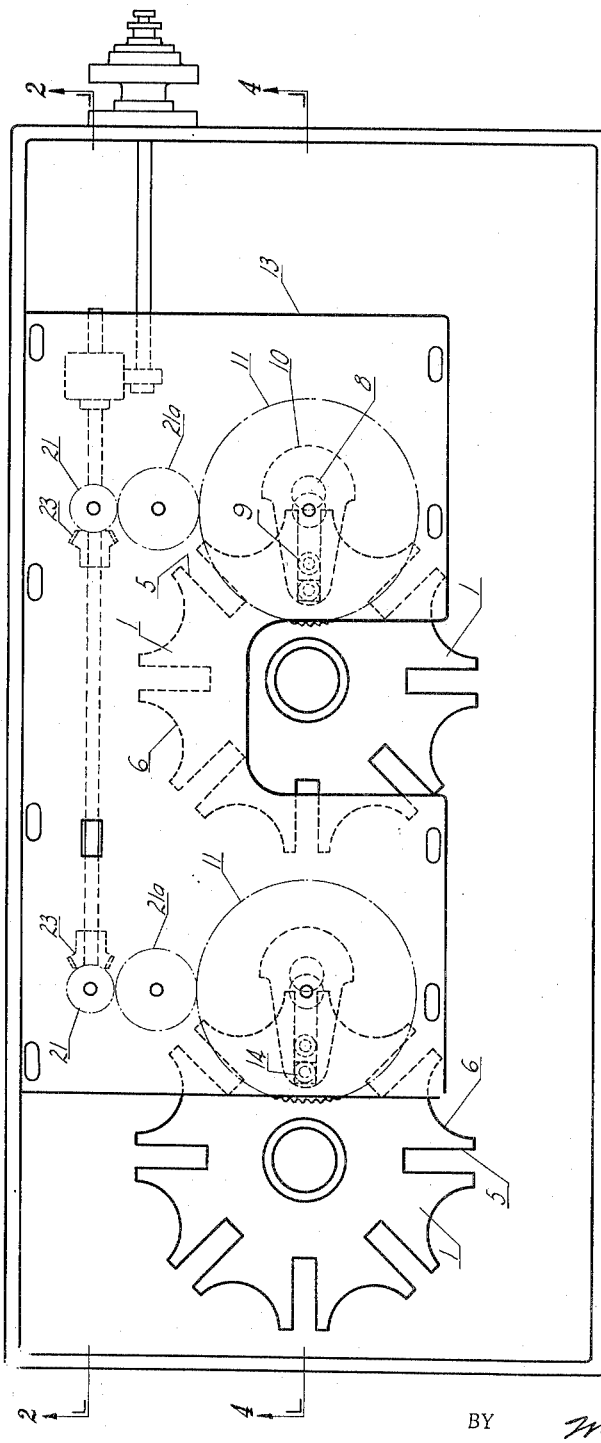
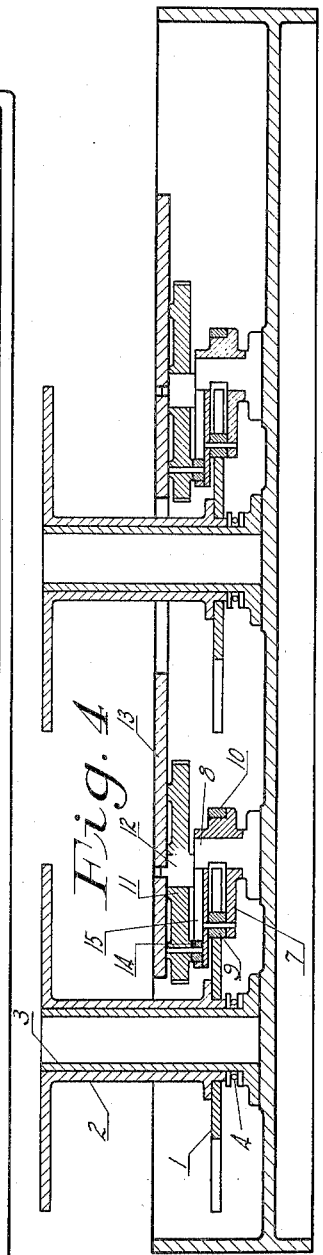
INVENTOR.
Theodore H. Sloan
BY William B. Jaspert
ATTORNEY.

Patented Mar. 18, 1941

2,235,047

UNITED STATES PATENT OFFICE 2,235,047

ADJUSTABLE GENEVA MECHANISM

Theodore H. Sloan, Charleroi, Pa., assignor to G. M. S. Corporation, Pittsburgh, Pa., a corporation of Pennsylvania Application September 30, 1938, Serial No. 232,643
Renewed December 30, 1939

5 Claims. (Cl. 74—436)

This invention relates to improvements in drive mechanisms of the type known as Geneva drives, and it is among the objects of the invention to provide means for varying the ratio of the index and dwell periods of the Geneva wheel without varying the speed of the prime mover.

These and other objects of the invention will become more apparent from a consideration of the accompanying drawings constituting a part hereof in which like reference characters designate like parts and in which:

Fig. 1 is a top plan view diagrammatically illustrating a Geneva wheel and driver therefor;

Fig. 2 is a vertical cross-sectional view taken along the line 2—2, Fig. 3;

Fig. 3 a top plan view of a double Geneva drive and adjusting mechanisms therefor; and Fig. 4 a vertical section taken along the line 4—4, Fig. 3.

In accordance with the present invention, the driver arm of a Geneva drive is driven in a manner to change its rate of movement while in indexing and dwell engagement with the Geneva wheel without changing its revolutions per minute.

The invention is especially useful for driving machinery of a character in which the work is acted upon during dwell periods of the machine, and wherein it is desirable to vary the ratio of indexing and dwell movement of the machine.

Such adjustments for a Geneva drive are obtainable by means of the following mechanism:

As shown in Figs. 3 and 4 of the drawings, one or more Geneva wheels 1 are mounted to drive one or more machine tables 2 journalled to be rotatable about a journal bearing 3, the table being supported on anti-friction bearings 4, the design of table and bearings being no part of the present invention; the Geneva wheel 1 is provided with slots 5 and cylindrical recesses 6. A driver 7 is mounted on a stud shaft 8 in the base of the machine and is provided with a roller 9 and convex lobe 10 for engaging the slots 5 and concave portion 6, respectively, of the Geneva wheel.

In accordance with the present invention, the speed of travel of the driver during the indexing movement may be varied by means of the following mechanism:

A gear wheel herein designated a bull-wheel 11 is mounted on a stud shaft 12 suspended from an adjustable plate 13, the bull-wheel 11 being provided with a slide block 14 that engages a way or guide slot 15 in the driver arm 7. When the axes of the stud shafts 8 and 12 are in vertical alignment, the Geneva wheel will be subjected to normal index and dwell periods. By changing the off-center position of the stud shafts 8 and 12, the rate of thrust or index movement of the arm 7 is varied while maintaining the same number of revolutions per minute of the driver arm. The off-center adjustment of the shafts 8 and 12 is effected by means of the following mechanism:

In Fig. 2 the adjustable plate 13 to which stud shafts 12 are secured and from which bull wheels 11 are suspended is shown with a lug 16 extending through an opening 17 in the machine base, which is provided with bosses 18 for receiving adjusting screws 19. By adjusting the latter, the adjustable plate 13 is shifted to effect the off-center seating of the stud shaft 12 relative to the fixed stud shaft 8 as shown in Fig. 4 of the drawings.

In Fig. 2 are shown stud shafts 20 on which are mounted combined spur gear and beveled gear wheels 21 and 22, respectively, the spur gear pinions 21 engaging the teeth of an idler wheel 21a, the teeth of which interact with the teeth of the bull-wheels 11, and the beveled gear wheels 22 engaging the teeth of pinions 23 driven by a common shaft 24 having a gear wheel 25 that connects to the power source. By actuating shaft 24, both bull wheels, as shown in Fig. 4, are simultaneously actuated, and by the adjustments of the set screws 19 the movement of plate 13 will simultaneously move the axes of the bull wheel stud shafts 12 to simultaneously change the thrust of the drive blocks 14.

It is thus seen that while the drive shaft 24 and the driven bull-wheels 11 may be maintained at a constant speed, the effective thrust of the Geneva driver arms may be varied to increase or decrease the ratio of the indexing and the dwell period of the Geneva wheels 1.

For normal indexing and dwell time of the driver, shafts 8 and 12 are in coaxial alinement at X and the drive block 14 acts upon the driver arm 7 through the angle A, Fig. 1. By adjusting the plate 13 to the off-center position with the axis of shaft 12 at Y, Fig. 1, and the axis of shaft 8 at X, Fig. 1, the drive block 14 acts upon the driver arm 7 through the angle B, which is greater than the normal angle, and consequently the rate of movement of the driver arm 7 will be decreased, thereby decreasing the speed of the indexing movement. By off-setting stud shaft 12 in the opposite direction to Z, Fig. 1, the effective angle C, Fig. 1, will be smaller than the normal angle A and consequently the indexing speed of the driver arm 7 will be increased.

It is evident from the foregoing description of the Geneva drive that for any adjustment of the driver speed the ratio of index and dwell period is changed while the bull-wheel actuating mechanism may be maintained at a constant speed.

It is further evident that the indexing speed may be varied over a wide range of adjustments, which is useful in machine drives where the work is of a character en masse or consistency to be effected by a too rapid swinging motion during its indexing movement.

Although one embodiment of the invention has been herein illustrated and described, it will be apparent to those skilled in the art that various modifications may be made in the details of construction without departing from the principles herein set forth.

I claim:

1. An adjustable Geneva drive comprising a wheel having indexing slots and concave dwell recesses, a driver for said Geneva wheel comprising a drive arm having a roller for engagement with the slots of said wheel and having a convex lobe for engagement with the concave faces of said wheel, actuating means for said arm comprising a bull wheel having sliding engagement with said arm, said bull wheel being driven at a constant speed, and means for adjusting the off-center position of the bull wheel and drive arm axes to vary the indexing speed of said Geneva wheel without disengaging the bull wheel and drive arm connection.

2. In a machine drive for a plurality of driven members, Geneva wheels each rotatable with one of said driven members, drivers for said Geneva wheels comprising drive arms having a roller for engagement with the slots of said wheels and having convex lobes for engagement with concave faces of said wheels, a common drive for said arms comprising bull wheels having sliding engagement with said arms, said bull wheels coacting with gear wheels of a common drive shaft, and said bull wheels and connected drive mechanism being suspended from an adjusting plate having means for moving the axes of the bull wheels relative to the axes of the drive arms to vary the extent of their sliding engagement to thereby vary the ratio of the indexing and dwell periods of said Geneva wheels.

3. In a drive mechanism, a Geneva wheel having slots and cylindrical recesses, a driver arm for said wheel having means for engaging the slots and cylindrical recesses of said wheel, and having a slide-way extending longitudinally of said arm, actuating means for said arm including means for slidingly engaging the slide-way of said arm, and means for changing the angular thrust of said sliding means to thereby vary the ratio of index and dwell movements of said driver arm.

4. In a drive mechanism, a Geneva wheel, a driver for actuating said wheel to subject it to successive index and dwell periods, and means for varying the timing of said index and dwell periods while maintaining fixed center distance of the wheel and driver, said means including actuating mechanism for said driver having a crank connection therewith, the crank of the actuating mechanism being adjustable relative to the crank engaging portions of the driver to vary the angular thrust of the driver while maintaining a constant R. P. M. of the actuating mechanism.

5. In a drive mechanism, a plurality of rotary members, a pair of Geneva wheels for actuating said members, a driver for each of said wheels to subject the members intermittently to rotary movement and dwell periods, crank arms for said drivers, a common actuating mechanism for said crank arms, and means for varying the angular thrust of said crank arms while maintaining constant the speed of the crank actuating mechanism whereby the rotary members are subjected to synchronous rotary motion and dwell periods for any adjusted position of said crank arms.

THEODORE H. SLOAN.